Dec. 1, 1942.    A. W. KEUFFEL ET AL    2,303,368
MEASURING TAPE
Filed Aug. 7, 1937    3 Sheets-Sheet 1
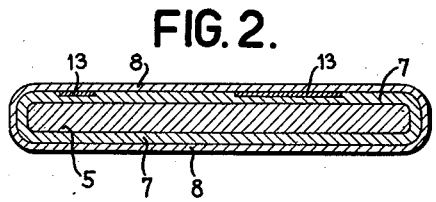
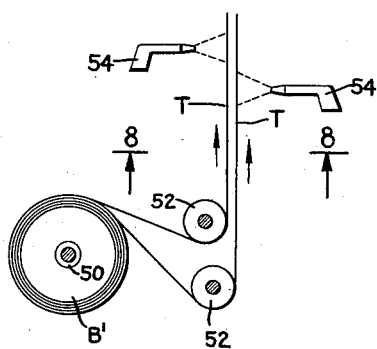
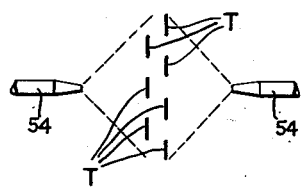
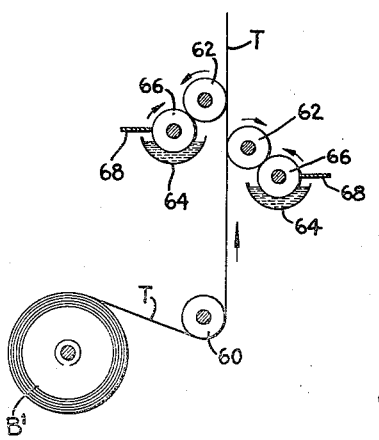
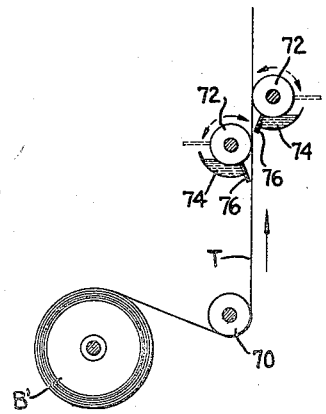
INVENTORS
ADOLF W. KEUFFEL
WALTER GOTHAM
BY
ATTORNEYS Dec. 1, 1942.  A. W. KEUFFEL ET AL  2,303,368
MEASURING TAPE
Filed Aug. 7, 1937   3 Sheets-Sheet 2
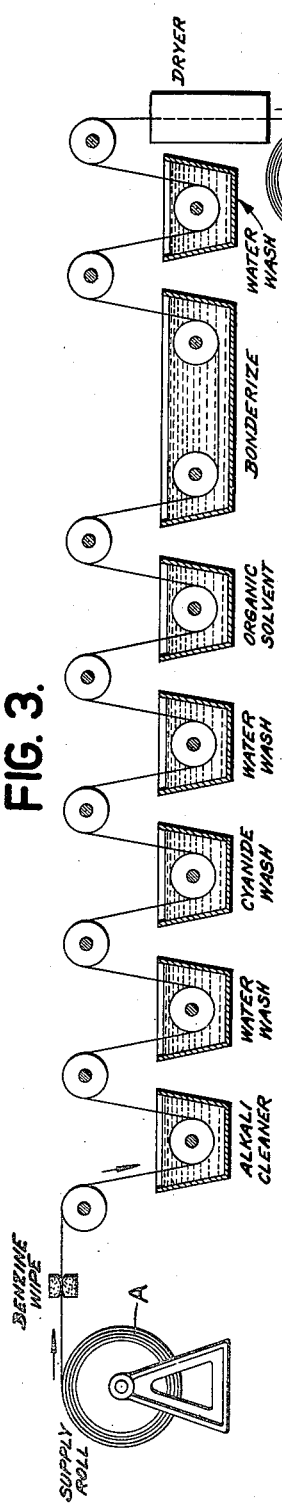
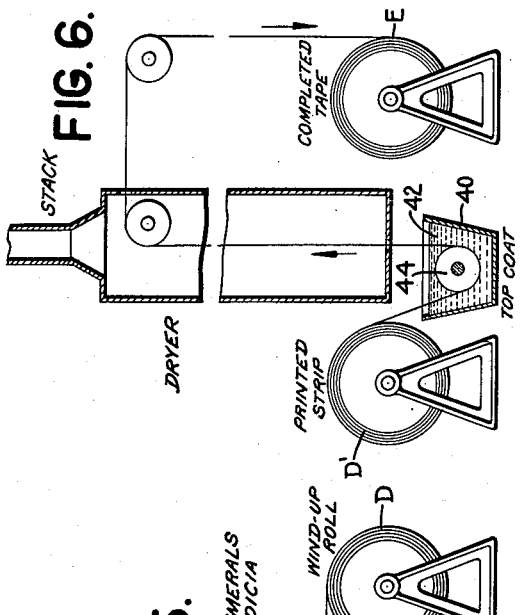
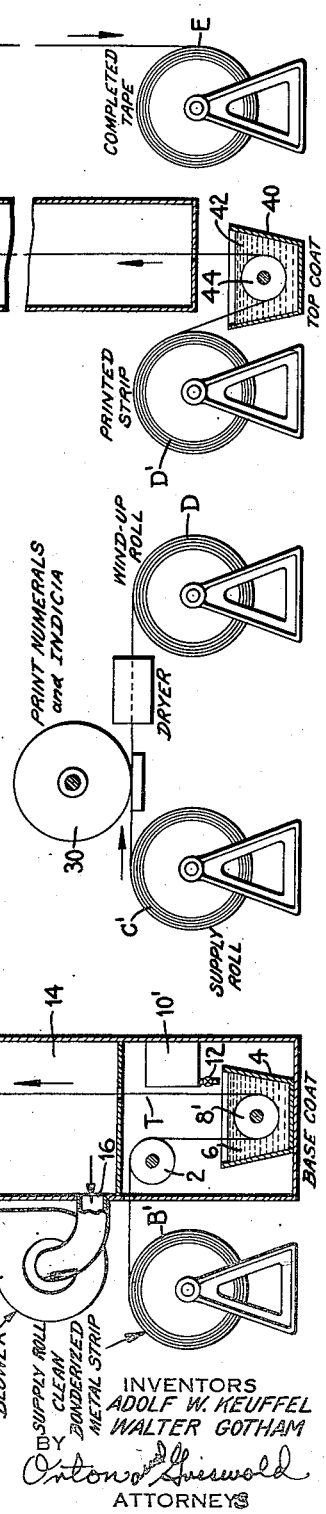
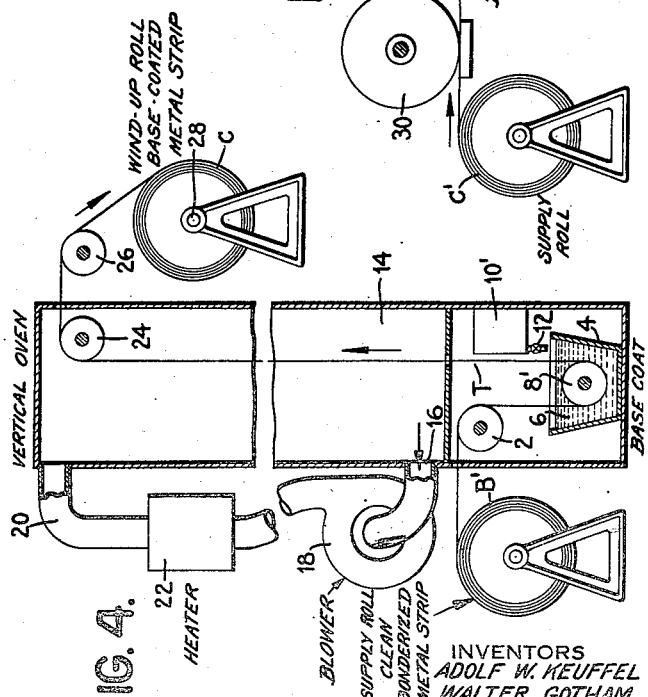
INVENTORS
ADOLF W. KEUFFEL
WALTER GOTHAM
BY
Orton and Griswold
ATTORNEYS Dec. 1, 1942.  A. W. KEUFFEL ET AL  2,303,368
MEASURING TAPE
Filed Aug. 7, 1937  3 Sheets-Sheet 3
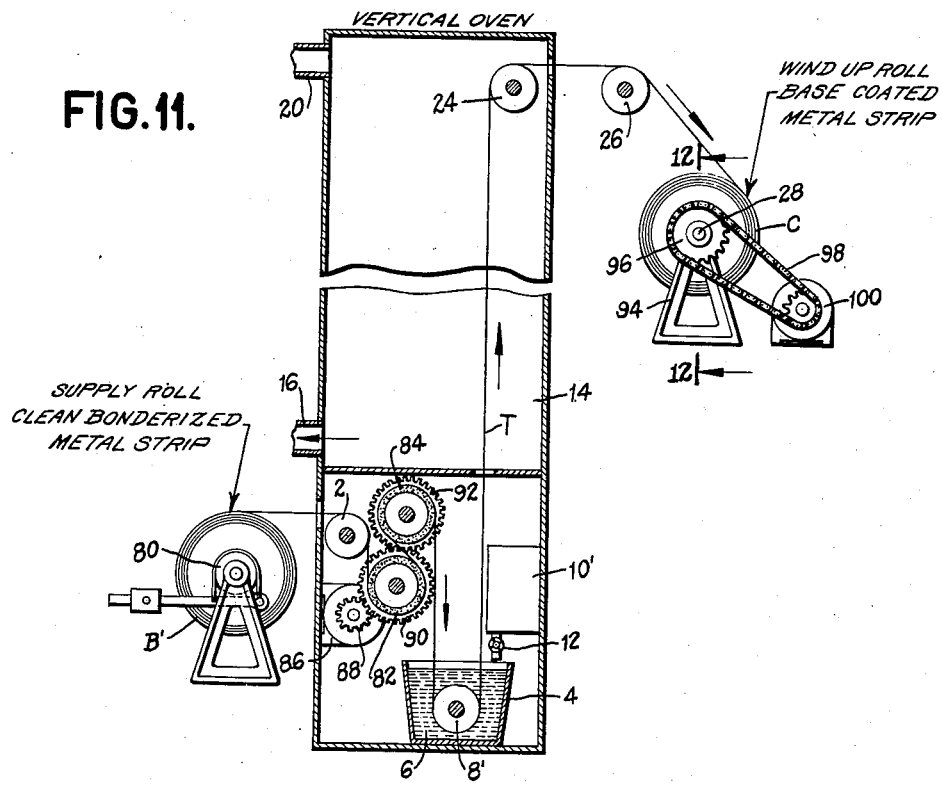
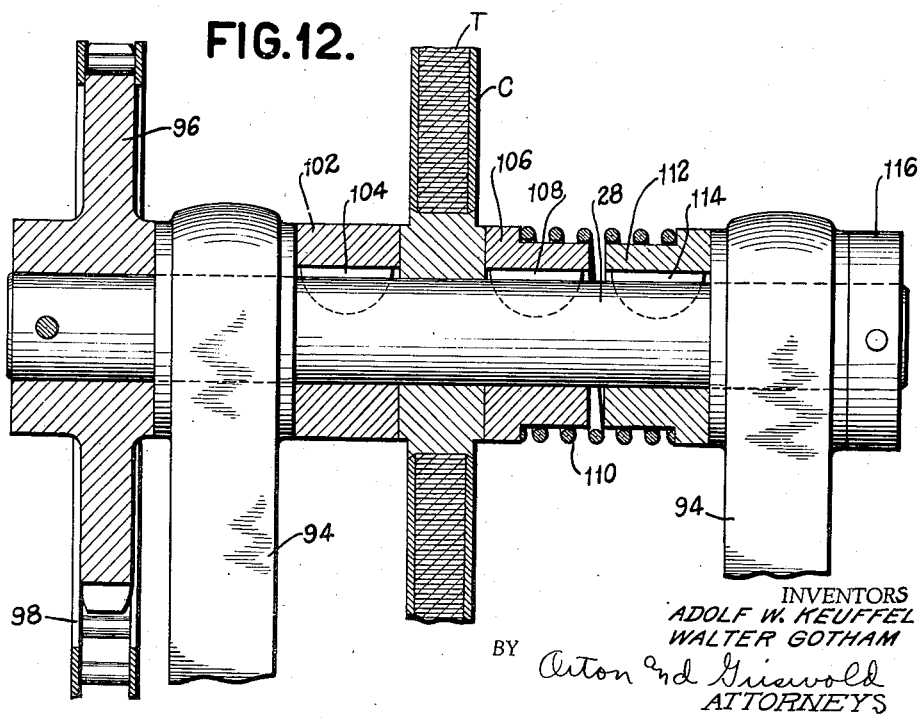

Patented Dec. 1, 1942

2,303,368

UNITED STATES PATENT OFFICE 2,303,368

MEASURING TAPE

Adolf W. Keuffel, Montclair, and Walter Gotham, Union, N. J., assignors to Keuffel & Esser Company, Hoboken, N. J., a corporation of New Jersey Application August 7, 1937, Serial No. 157,944

9 Claims. (Cl. 91—16)

This invention relates to a method and apparatus for preparing measuring tapes, rules and other scales of the kind used by engineers and surveyors, also carpenters, builders, carpet layers and others to measure distances, either horizontal or vertical, although not so limited. The invention is particularly suitable for preparing a steel measuring tape of the type described and claimed in application Serial Number 690,064 filed September 19, 1933, entitled Measuring tapes, now Patent No. 2,089,209, dated August 10, 1937, of which this disclosure is a continuation in part.

Heretofore, measuring tapes have been made either of woven fabric or of a ribbon of steel. Fabric tapes are apt to be inaccurate since they stretch in use and are rapidly worn out if subjected to hard usage. Steel tapes are preferred but their surface soon becomes worn and rusty rendering the markings thereon difficult to read, especially out of doors and in darkened localities, because of the lack of contrast between characters and background. Moreover, the numerals and subdivisions of the scale representing units of lineal measure and fractions thereof have heretofore been created by an etching process on the surface of the steel tape or by electro-plating. To create the markings on the steel tape by means of etching, the superficial structure or background of the steel is eaten away by an acid while portions of the surface are protected against the acid to form the markings of scale and numerals. The etching of the background along the longer subdivisions of the scale and such numerals as "1" and "4" weakens the tape in a transverse line extending substantially wholly across the tape along side of a relatively thicker portion forming, in effect, a rigid bar. After such a tape has been in use and has become oxidized, the etched portions are further weakened and, upon bending, frequently break at such a subdivision so that patching or repairing of broken tapes is a frequent necessity. It is not only difficult to repair a steel tape and maintain its true length, but where the repairs have been made, the markings on the surface of the tape are obliterated.

It has been heretofore proposed to avoid the weakening of the metal through etching, by electro-plating markings and/or background on the steel tape as a base. The metal used in the electro-plating has usually been nickel and an attempt at contrast has been made by employing bright and black nickel. Experience has shown, however, that such nickel deposit offers practically no contrast. Thus there has been presented all of the objections sought to be avoided and processes have been involved which are both costly and complicated.

The present invention has for its objects to provide a process which avoids the weakening of a steel tape by etching; protects the surface of a flexible or inflexible metal strip against corrosion; affords a contrast between the background and the markings as an aid to reading the scale in darkened localities; permits of a contrast between the markings of, say, units and fractions of units of linear measure in the interest of a celerity of reading and protects the markings.

Another object resides in providing an apparatus with which the process may be expeditiously carried on.

A further object resides in providing coating compositions which permanently adhere to the metal base, can be printed upon and withstand the usual wear to which such tapes are subjected.

In carrying the invention into effect, it is preferred to coat the cleaned surface of a flexible or inflexible metal ribbon or strip, for instance, a steel tape, after certain pretreating steps, with a coating or film of preferably a light or light reflecting color, such as white. Hereinafter all such flexible or inflexible metal strips, which may be steel, brass or any other suitable metallic material and which have a scale or scales on the surface thereof, will be referred to, for convenience, as tapes. The invention will be described with respect to a steel tape but is to be understood that it is equally applicable to a flexible or inflexible ribbon or bar of any metallic material, referred to herein generically as a metallic strip.

The strip is coated upon the upper and preferably also the lower surfaces and along both edges with a protective film of a composition that when hardened or dried will retain suitable flexible characteristics, it being found that such a complete sheath around a flexible tape, for instance, resists the strains and stresses set up in the film when the tape is bent, and such strains and stresses do not rupture or break the film away from the steel or other flexible metal. The coating is flexible enough to withstand bending and strains without cracking on an arc of any radius in which a tape may be bent without breaking. The graduations of the scale may then be imprinted on the light reflecting surface in a contrasting color, say, one that is light absorbent, for instance, black, and numerals representing fractions of the units of measure may be imprinted thereon in the same color. The numerals representing the units of lineal measure may be imprinted in the same color, or for convenience in reading, in still another color, say, red, to contrast with both the background and the scale graduations. Superimposed upon the inner or base coating and the markings is an outer protective transparent coating bonded to the inner coating, through which the markings are clearly visible.

Another object of the invention is a method by which a wear-resisting finish of the character described may be applied to metal strips and which will not be deleteriously affected by the constant flexing, say, of a tape. To this end, an opaque film of predetermined characteristics is caused to be bonded to the metal strip and the numerals and other indicia printed on the tape are protected by an overcoating of, for instance, a translucent or transparent film of such characteristics as do not produce any undesirable reaction between the two coatings.

The invention also seeks to provide certain new and useful compositions which can be employed in the process herein to produce a tape of the characteristics described herein and also in the copending application Serial Number 690,064 in which such tapes are claimed.

These and other objects of the invention and the means for their attainment will be more apparent from the following detailed description taken in connection with the accompanying drawings, illustrating a preferred embodiment thereof, and in which:

Figure 1 is a view showing, in plan, a fragmentary portion of a measuring tape produced in accordance with the process of this invention;

Figure 2 is a transverse sectional view taken in the plane indicated by the line 2—2 of Figure 1, looking in the direction of the arrows;

Figure 3 is a diagrammatic view of an apparatus that may be employed in this process for cleaning the metallic strip preparatory to applying the base coat;

Figure 4 is a diagrammatic view of an apparatus that may be employed in this process for applying the base coating to a metallic strip and drying or baking it;

Figure 5 is a diagrammatic view of an apparatus that may be employed in this process for applying the indicia comprising graduations, numerals and the like to the coated metallic strip;

Figure 6 is a diagrammatic view of an apparatus that may be employed in this process for applying the top or overcoat to the coated printed metallic strip and drying this last applied coating;

Figures 7, 9 and 10 are diagrammatic views of apparatus that may be used in conjunction with part of the apparatus illustrated in Figure 4 for applying the base coat or that shown in Figure 6 for applying the top coat;

Figure 8 is sectional view along the line 8—8 of Figure 7 looking in the direction of the arrows;

Figure 11 is a view in section corresponding generally to Figure 4 but showing the details for the positive let-off and overrun take-up; and Figure 12 is a view in section along the line 12—12 of Figure 11.

A strip of some suitable metal forming a tape is indicated at 5 in Figure 2. Superimposed upon all surfaces of the strip 5 is a ground coating 7 of some appropriate material, i. e., a pigmented film, such as enamel, lacquer or the like, which will form a firm bond with the metal, and which film, when dry, will retain a desired degree of flexibility. This coating, in the preferred embodiment, completely surrounds the metal strip so that when the strip bends, it will conform thereto and be unaffected thereby.

The background formed by this ground coating is conveniently white in color and the scale graduations, both the unit graduations 9 and the fraction graduations 10, are imprinted thereon in a contrasting color, such as black.

In the illustrated embodiment, the scale is subdivided into markings representing feet and inches and the numerals representing inches are also imprinted in black, as at 11.

The units of lineal measure, in this instance, feet, may be imprinted in still another contrasting color, say, red, as indicated at 13 and, in view of the fact that the background is of a contrasting color, smaller numerals 15, also may be imprinted in red along the scale between the large numerals 13, so that the reading in units and fractions may be readily made.

A top coating 8 of a clear transparent type is then applied over the facing and, in fact, completely surrounds the coating 7 so as to protect the printed graduations and the numbers and provide a wear-resisting finish.

While various types of coatings may be availed of for the purpose specified, it has been found desirable to use for the ground coat an opaque composition, for instance, an enamel or equivalent material having the capacity to bond with metal, say, steel. The surface of the strip 5 is first prepared by a suitable process to cause it to be more receptive to the coating. In the case of steel, this not only gives a rustproof finish to the surface of the steel, but also prepares the steel so that a subsequent finish, such as an enamel, will be able to firmly bond or adhere to the surface of the steel. Brass, may if desired, be given a well known cyanide treatment which causes the surface to be more receptive to the enamel and form a better bond therewith than untreated brass. In the preferred embodiment, as now practiced, a pigmented composition, such as enamel, preferably white, is applied to the prepared metal strip. This first coating we designate as the ground coat or base coat.

After the ground coat has dried, the indicia, graduations 9 and 10 and numbers 13, 15 are then printed on the ground coat 7 by means of the transfer of a special printing ink from dies in such a way that the graduations formed on the tape may be the exact length. The link, which we prefer to use, has the property of biting in and embedding itself in the ground coat and yet is not softened or attacked by the solvents of the top coating and thus the distortion and shifting of the graduations is prevented during manufacture. The printing dies force the ink forming the characters into the ground coat, to some extent at least. It is desirable that the indicia be embedded in the ground coat so that the surface of the ink markings and the surface of the ground coat lie in substantially one plane and present a smooth surface without projections formed by the ink of the impressions. Thus where the indicia are impressed by dies, decalcomania, etc., the ink may be permitted to dry to a predetermined degree, then preferably heated to a predetermined degree and then the imprinted tape subjected to pressure as by being passed between pressure rollers.

A top coating 8 of a clear transparent type is then applied over the facing comprised of the ground coat and indicia to protect the printed graduations and the numbers, and in this way a wear-resisting finish is applied to the tape.

It is preferred that the ground coat and the top coat have different characteristics so that the ground coat will not be affected by the solvent action of the top coating subsequently applied. Were a top coat of the same characteristic as the ground coat used, as, for instance cellulose compositions, the top coat would tend to exert its solvent action on the ground coat, causing the shifting of the printed graduations, thus causing the graduations to become wavy and actually affecting their accuracy.

For the ground coat, either of the following two types of materials is chosen:

(1) A synthetic resin composition comprising for example phenol-formaldehyde or alkyl resin.

(2) A lacquer composition comprising cellulose esters.

It has been found most practical to use type No. 1 as the ground coat and type No. 2 as the top coat although these may be reversed or both coats may have similar bases. In either case, the ground coat is pigmented and the top coat is transparent. Both of the compositions have an elastic limit well within the elastic limit of steel. Thus the finishing materials are of a very flexible nature which will stand up under continuous flexing of the metal tape as, for instance, caused by the unwinding and rewinding of the tape in and out of its case during use. The finish also has perspiration resisting properties, that is, it is not affected by the action of the dialyzing organic acids commonly found in perspiration and transmitted to the tape by the hands of the user. The finish does not lose its property of adhesion to the steel nor does it break down under the severest handling. It withstands liquids ordinarily corrosive to metal tapes such as marsh water, salt water, crude oils, etc.

Type No. 1, particularly suitable for the base coat, may be a composition with an oil modified phenol formaldehyde or alkyd resin colored white by a titanium oxide pigment and dissolved in suitable solvents for the resin. If desired, metallic salt catalysts may also be incorporated to hasten drying. The resulting enamel vehicle tends to form surface coats of great flexibility, durability and good adhesion to most surfaces. This enamel needs no priming coats and dries with a smooth, glossy surface ideally adapted for the purpose at hand. On this can be used the printing ink aforesaid which may resoften the enamel film. When the ink is dry the whole is coated with a non-oxidizing, flexible film consisting of a tough nitrocellulose lacquer giving a permanently flexible film over the entire surface. For this top coating, a lacquer with a cellulose ester base, plasticizers and solvents, which do not affect the base coat, may be employed. The selection of the solvents is important because such solvents must not dissolve to any appreciable extent either the base coat or the ink. Since the base coat is generally baked, its solubility is, to some extent, reduced and a test will determine whether the top coat will dissolve the base coat after the heat treatment.

In practicing this process, it is possible to choose a white ground coat which will not discolor with age and exposure to light and a top coating which is clear, transparent and colorless and permits the indicia to be clearly visible therethrough.

The materials selected are adapted for application to the tape by various methods, such as by passing over a roller coating machine which coats one or both faces at a time, by spraying or by direct immersion and withdrawal from the bath. The latter method is preferred because both sides of the strip and the edges are covered simultaneously, thus forming a complete envelope or sleeve around the entire strip, not only when the first coat or ground coat is applied but also after the graduations and numbers are printed on the ground coat. Because of the fact that the solvents in the finishing material used for the top coat do not affect the ground coat or the ink used for the graduations and numbers, the top coat may also be applied by direct immersion and withdrawal. Preferably, also in the application of both coatings the tape is passed through the bath at such a slow rate of speed that the composition has time to set at the point of emergence.

Subsequent to each application of coating composition, the film is permitted to dry or may be baked for a period of time depending upon the characteristics of the composition.

With such materials of the character described, it has been found preferable to dry the coating of synthetic composition (type No. 1) by heating or baking the coated strip at approximately a temperature of from about 180° F. to about 240° F. while the coating of cellulose derivative (type No. 2) will dry satisfactorily in the air, although, in the interest of rapid drying, this coating may also be dried at higher temperatures.

The details of the process and the apparatus used in connection with carrying out this invention is best described in connection with the accompanying drawings and referring particularly to Figure 3, the reference numeral A refers to a roll of metal tape. Usually these rolls are several hundred feet in length, and for making steel tapes are strips of spring steel commonly used for this purpose. As illustrated in Figure 3 the supply roll of the metallic strip forming the tape may be unwound by passing the strip of metal through a benzine wiper to remove the protective grease film and any surface dirt thereon. The tape is then conducted through a plurality of solutions to further cleanse the tape and remove all foreign matter therefrom in order that a perfectly clean strip of metal may be obtained which will firmly bond with the coating composition to be applied. Specifically, the tape after the benzine wipe is passed through an alkali cleaner followed by a water wash which in turn is followed by a cyanide wash that is removed by passing the tape through a quantity of clear water. This removes all of the principal metallic oxides, etc. however, any residual oil or grease that may still be on the tape must be removed and this is accomplished by passing the tape through an organic solvent.

It is extremely important that the tape prepared according to the teachings of this invention shall be able to withstand corrosion, particularly when the applied coatings are scratched. It has therefore been found advisable to pass the tape through a solution of an agent which will form a rust-proofing coating thereon. The treatment with such an agent is known as "Bonderizing" and comprises subjecting the cleaned metal to the action of various salts comprising phosphates. Among the well known processes for accomplishing this result are those disclosed in the following patents: 1,069,903 dated August 12, 1913, issued to Richards; 1,167,966 dated January 11, 1916, issued to Allen; 1,206,075 dated November 28, 1916, issued to Allen; 1,291,352 dated January 14, 1919, issued to Allen; 1,341,100 dated May 25, 1920, issued to Allen; and 1,842,085 dated January 19, 1932, issued to Green and Jones, which disclose various phosphate and phosphoric acid and other treatments applied to the surface of metals for making them responsive to receiving coatings and also rustproofing the metals. After the "Bonderizing" treatment the tape is washed, dried and wound up on a roll B, ready for the subsequent treatment. While Figure 3 illustrates the tape as passing through the several treatments continuously it may be found advisable to pass the tape through one or more at a time and then rewind it before continuing the cleansing treatment. Some of the steps may be omitted or the relative order varied as will be evident.

One or more rolls of the chemically cleaned, rust-proofed, strips is transferred to the base coating apparatus illustrated in one embodiment in Figure 4.

The roll B' may be positioned on a shaft adjacent a plurality of other rolls. As the tape or tapes are withdrawn from the roll B' they are carried over a guide roll 2, from which they are directed to a tank 4, which holds a quantity of base coating composition 6. The tape is guided through the coating composition by a roll 8' mounted on a shaft within the bath. To supply the coating composition to the tank 4, a reserve container 10' provided with a valved outlet 12, may be arranged above the tank 4.

It has been found that a coating composition which fills the requirements heretofore set forth is a pigmented, synthetic resin, coating composition in which the resin may be any of the well known types, as for example, phenol formaldehyde, alkyd, etc., either normal or modified with oils, as for example, drying oils. One of the preferred compositions which has been successfully employed, has the following composition:

Solid alkyd or phenol aldehyde resin, oil modified, about _____ 27%
Pigments, such as titanium oxide, titanox B, zinc sulphide, antimony oxide, titanated lithopone, about _____ 33%
Solvent, approximately _____ 40%

The solvent, based on the total composition, may comprise about 30% of aliphatic petroleum hydrocarbon such as mineral spirits with about 10% of aromatic hydrocarbons, as for example, turpentine, turpene, dipentine, toluol, benzol, xylol and the like.

The composition should preferably also include metallic dryers, such as oil soluble salts of cobalt, manganese and lead in the proportion of a fraction of a per cent of the solid resin.

It has been found that coating compositions of the type above described are particularly useful for forming the ground or base coat. When a phenol aldehyde resin is employed, the coating will, of course, be thermal setting, and the subsequent treatment should involve baking the composition so as to permanently set it and bond it to the metal. While the above described compositions have been found most suitable, it is possible to make certain modifications in this composition, within the skill of those in this art, without departing from the spirit and scope of this invention.

In the preferred embodiment of this invention the tape T is passed through the coating composition 6 at a very slow rate of speed. In commercial practice it has been found desirable to continuously withdraw the tape at a speed approximating a few inches per minute. In this manner the coating composition has an opportunity to set as the tape leaves the bath, and there is not the danger of the coating composition running on the tape to make it irregular or streaked. On the contrary, by passing the tape through the bath very slowly, the coating is very uniform.

After the base coating composition has been applied, the tape is passed up to a heated zone in a chamber 14, that is in effect a vertical oven. In the chamber 14 the tape is passed countercurrent to a circulating heated gas such as air which takes up the solvents evaporated and bakes the coating. As illustrated in Figure 4 a pump or fan 18 withdraws air from near the bottom of the chamber 14 through a conduit 16, passes it through a heater 22 from which it is conducted back to the top of the chamber by a conduit 20. The temperature of the air is controlled by the heater 22 and obviously the system must be bled from time to time or continuously and some fresh air substituted. Ordinarily leakage through the top inlet and outlets, etc. is sufficient. Preferably, the vertical oven is of quite substantial heighth, in order that the slowly moving strips of coated metal will have an ample time to discharge all solvents, and in the case of those coating compositions which require baking, to assume those temperatures necessary to thermally set the resin.

After the tape is passed through the vertical oven in a time sufficient to accomplish the object above described, it passes over a guide roll 24, to a second roller 26, and is wound up on the roll C. In a preferred modification the passage of the tape is accomplished by a compensated positive in feed with an over run take up. Specifically in the apparatus illustrated the roll B' would be braked or have a friction let off. Roller 2 would be driven at a constant rate of speed and provided with means to prevent slipping on the roll. All of the other rolls serve simply as guide rolls and the reels on which the rolls of tape C are wound should have an over run drive. In this way the travel of the tape and the tension is constant.

A form of compensated positive in-feed with an overrun take-off is illustrated in Figures 11 and 12. As therein illustrated the supply roll B' has a brake let-off and the strip passes over an idler roll 2 to a pair of rubber-covered rolls 82 and 84 about which the strip is wrapped for extended and firm frictional engagement. Attached to the rolls 82 and 84 are meshing gears 90 and 92 driven by a gear 88 which in turn is driven by a motor 86 through a gear reduction system not specifically illustrated. The gear reduction system is such as to produce a peripheral speed on the rolls 82—84 of a few inches per minute and this is a positive feed. The strip after passing through the coating composition 6, around the roller 8', through the oven 14 and over the idler rolls 24 and 26 is wound on a reel at C. The reel C is freely rotatable upon the shaft 28 (Figure 11) as will be clear in Figure 12. Keyed to the shaft 28 and on each side of the reel C are members 102 and 106 which rotate with the shaft. A spring 110 between member 112 also keyed to the shaft but not necessarily so and member 106 causes frictional engagement between the members 102 and 106 and the reel C. Spreading of the spring 112 is prevented by the supports 94 for the shaft 28. The shaft 28 is driven by a slow speed motor 100 through a suitable drive such as the chain drive 98 engaging the sprocket 96 keyed to the shaft 28. The speed of rotation of the shaft 28 is such that the roll C will at all times tend to rotate faster than is necessary to take up the strip T and thereby keeps the strip under tension at all times. It will be noted that the rate of travel of the strip T is dependent upon the rate of rotation of the rolls 82—84 and not the rate of rotation of the shaft 28.

Instead of employing the apparatus and process illustrated and described in connection with Figure 4, those shown in Figures 7, 8, 9 and 10 might be substituted.

The coated metal strips wound on the roll C can now be transferred to the apparatus shown in Figure 5, wherein the roll C of Figure 4 is designated as C'. As the coated tape is withdrawn from the supply roll C', it passes to a device 30 for printing the numerals and indicia and from this goes through a drier to remove any solvent from the ink after which the tape may be rewound on the wind-up roll D. Instead of employing the continuous type of apparatus for printing the numerals and indicia as illustrated in Figure 5, the coated metal strips may be cut up into suitable lengths and the printing done by hand on printing machines as is well known in the art. As the ink is applied to provide indicia comprising numerals and graduations, it should preferably sink into the surface of the coating on the metal strips and form a perfect bond therewith. The extent to which the ink will imbed itself in the coating on the metal strips depends on a number of factors, including the character of the coating, as well as the character of the ink. An example of the printing ink which has been found satisfactory for the purpose is a printing ink of the oxidizing type having incorporated therein printing solvent, such as xylol, high boiling naphtha, toluol, benzol, or the equivalent to resoften parts of the coatings on the metal strips. An alternative ink comprises one with a resin base, with which is included a toning blue and Milori blue, both pigments used in regular printing ink, together with a mixture of carbon black, cobalt and paste dryer. Whether or not the ink redissolves any of the base coating, the solvents are completely removed and the ink is firmly attached to the coating by passing the printed strips through the dryer, or its equivalent.

The printed strip is then transferred to the position indicated at D' in Figure 6. From this supply roll D', the printed strip is passed through a bath of coating composition 42 in a receptacle 40 and guided therethrough by a guide roll 44.

The coating composition 42 is preferably of the type known as lacquer and should be clear, or at any rate, transparent. A composition suitable for this purpose has the following ingredients:

| | Parts by weight |
|---|---|
| ½ second R. S. nitrocellulose | 14 |
| Dibutyl phthalate (plasticizer) | 4.65 |
| Secondary amyl acetate (solvent) | 25 |

Various additional solvents, diluents, partial solvents and even non-solvents, comprising alcohol, amyl alcohol, ethyl acetate, toluol, mineral spirits, etc., to make 100 parts of lacquer.

The lacquer may be thinned by relatively decreasing the proportions of the cellulose ester and plasticizer to the solvents and diluents.

This lacquer is particularly useful as a top coat in this process, since after the pigmented coating has been set and dried, it will not redissolve when the lacquer is applied. If the lacquer contains solvents which, under the conditions of application will redissolve the pigmented coat or the ink, it would run and cover other portions of strip, reducing the accuracy of the graduations as well as making them indistinct. Alternatively, the pigmented coating, when baked or otherwise made insoluble, does not limit the selections of solvents for the top coating.

In Figure 7 is illustrated an alternative apparatus and method for applying either the base coat or the top coat. According to this method the chemically cleaned rolls of metal strip, with or without previous rust-proofing treatment, are mounted adjacent to each other on the shaft 50, from which they are withdrawn and passed over guide rollers 52, arranged so as to guide the tape along the relative paths as indicated in Figure 8. In this manner the tapes pass upwardly between the two spray nozzles 54, adapted to project a spray of the base coating composition on both sides of the tape when they are in the two staggered rows as indicated in Figure 8.

Another alternative method for coating the tape is illustrated in Figure 9, wherein the roll of chemically cleaned metal strip B' supplies the tape T which passes under the guide roller 60, from which it is guided upwardly between coating rollers 62, rotating with the tape in the direction indicated by the arrows. These coating rollers 62, are supplied with the coating composition 64 by means of intermediate rolls 66 which dip into the bath of coating composition 64 and move in contact with the coating rolls 62. As the rolls 66, rotating in the direction indicated by the arrows, dip into the coating composition 64 the amount of material picked up on their surfaces is controlled by the doctor blades 68. This film of controlled thickness on the roll 66 is then transferred to the roll 62 which in turn applies it to the tape T.

A generally similar method of applying the base coating is illustrated in Figure 10 wherein the metal strip withdrawn from the roll B' is guided by the roller 70 to a position between two coating rollers 72 that may be rotated in either direction but generally rotate in a direction opposite that in which the tape is traveling. Coating composition 74 is picked up by the rollers 72 which dip into the composition and the thickness of the film is controlled by the doctor blade 76.

Several methods of applying this coating composition uniformly to one or both sides as well as the edges of the tape which are illustrated in connection with Figures 4, 7, 9 and 10 can be used not only for applying the base coating but also for applying the top coat as shown in Figure 6.

By following the teachings of this invention metal strips of the type used for measuring tapes and the like can be readily and completely coated in the manner described to produce a new and useful tape in a convenient and inexpensive manner.

While this invention has been described as to certain preferred embodiments thereof, these are to be considered as illustrative of the invention and not in limitation of it, the scope of the invention being set forth in the appended claims.

What is claimed is:

1. The method for making a coated metal tape which comprises preparing a metal strip to receive a coating composition, continuously passing the metal strip through a pigmented coating composition that will set when exposed as a film at the rate of a few inches per minute by positively feeding the strip into the composition and withdrawing it from the coating composition under tension, whereby the coating composition sets at the point of emergence of the strip from the liquid coating composition.

2. The method for making a coated metal tape which comprises preparing a metal strip to receive a coating composition, continuously passing the metal strip through a pigmented coating composition while under tension at the rate of a few inches per minute whereby the coating composition sets at the point of emergence of the strip from the liquid coating composition and passing the coated metal strip through a heated zone to remove the solvents permanently and set the coating.

3. The method for making a coated metal tape which comprises preparing a metal strip to receive a coating composition, continuously passing the metal strip through a pigmented coating composition at the rate of a few inches per minute whereby the coating composition sets at the point of emergence of the strip from the liquid coating composition, passing the coated metal strip through a heated zone to remove the solvents permanently and set the coating and applying indicia comprising numerals and graduations to the coated metal strip with an ink which will firmly bond with the coating.

4. The method for making a coated metal tape which comprises preparing a metal strip to receive a coating composition, continuously passing the metal strip through a pigmented coating composition at the rate of a few inches per minute whereby the coating composition sets at the point of emergence of the strip from the liquid coating composition, passing the coated metal strip through a heated zone to remove the solvents and permanently set the coating, applying indicia comprising numerals and graduations to the coated metal strip with an ink which will firmly bond with the coating and applying a top coat of a transparent coating composition to the printed coated strip.

5. An apparatus for coating metal strips comprising means for mounting a supply roll of metal strip, means for positively withdrawing the strip from the supply roll and guiding the metal strip at a very low rate of speed through a vessel adapted to contain a coating composition, means for guiding the metal strip through a heated zone, means for removing the metal strip from the heated zone and means for maintaining the strip under a substantially uniform tension.

6. The method for making a coated metal tape which comprises preparing a metal strip to receive a coating composition, continuously passing the metal strip through a solution of a pigmented resinous coating composition at the rate of a few inches per minute, the viscosity of the coating composition and the rate of travel being adjusted so that the coating composition assumes a preliminary set at the point of emergence of the strip from the liquid coating composition, controlling the travel of the strip with a positive let-off and a frictional take-up to provide constant tension on the strip and passing the strip through a heated zone to remove the solvents and permanently set the coating.

7. The method for making a coated metal tape which comprises preparing a metal strip to receive a coating composition, continuously passing the metal strip through a solution of a pigmented resinous coating composition at the rate of a few inches per minute, the viscosity of the coating composition and the rate of travel being adjusted so that the coating composition assumes a preliminary set at the point of emergence of the strip from the liquid coating composition, controlling the travel of the strip with a positive let-off and a frictional take-up to provide constant tension on the strip, passing the coated metal strip through a heated zone to remove the solvents and permanently set the coating against solution in the solvents of a protective coating, applying indicia to the coated metal strip with an ink which will firmly bond with the coating and applying a top coat of a transparent coating composition the solvents of which will not substantially dissolve the pigmented coating composition on the strip.

8. The method for making a coated metal tape which comprises continuously passing the metal strip through a pigmented coating composition comprising a synthetic resin which will set under the influence of heat while retaining its elasticity, dissolved in a solvent therefor, under substantially constant tension and at a rate correlated with the viscosity and other characteristics of the pigmented coating composition which will permit an original set of the coating at the point of emergence of the strip and passing the coated metal strip through a heated zone to remove the solvents and permanently set the coating.

9. The method for making a coated metal tape which comprises continuously passing the metal strip through a pigmented coating composition comprising a synthetic resin which will set under the influence of heat while retaining its elasticity, dissolved in a solvent therefor, under substantially constant tension and at a rate correlated with the viscosity and other characteristics of the pigmented coating composition which will permit an original set of the coating at the point of emergence of the strip, passing the coated metal strip through a heated zone to remove the solvents and permanently set the coating, applying indicia to the coated metal strip and applying a top coating of a transparent coating composition the solvents of which will not substantially dissolve the pigmented coating composition on the strip.

ADOLF W. KEUFFEL.
WALTER GOTHAM.

CERTIFICATE OF CORRECTION.

Patent No. 2,303,368.   December 1, 1942.

ADOLF W. KEUFFEL, ET AL.

It is hereby certified that error appears in the printed specification of the above numbered patent requiring correction as follows: Page 2, second column, line 56, for "link" read --ink--; page 6, first column, lines 25 and 36, claims 2 and 3 respectively, for the words "permanently and" read --and permanently--; and that the said Letters Patent should be read with this correction therein that the same may conform to the record of the case in the Patent Office.

Signed and sealed this 9th day of February, A. D. 1943.

(Seal)

Henry Van Arsdale,
Acting Commissioner of Patents.